Patented Aug. 18, 1925.

1,550,319

UNITED STATES PATENT OFFICE.

RUSSELL HOPKINSON, OF ELMHURST, NEW YORK, ASSIGNOR TO GENERAL RUBBER COMPANY, OF NEW YORK, N. Y., A CORPORATION OF NEW JERSEY.

CRUDE RUBBER AND PROCESS OF PRODUCING THE SAME.

No Drawing. Application filed May 12, 1924. Serial No. 712,578.

*To all whom it may concern:*

Be it known that I, RUSSELL HOPKINSON, a citizen of the United States, and a resident of Elmhurst, county of Queens, State of New York, have invented a certain new and useful Improvement in Crude Rubber and Processes of Producing the Same, of which the following is a full, clear, and exact description.

The present invention relates to a new rubber and the process of producing the same, and particularly to rubber which is obtained by a spray desiccation process like that subject matter of Patent No. 1,423,525, granted to Ernest Hopkinson.

The object of the invention is to produce a crude rubber which shall have all the enhanced qualities of rubber obtained by the spray desiccation process of said Patent No. 1,423,525 and at the same time shall have the soft, plastic and "tacky" qualities before vulcanization which are desirable for factory operations. A further object is to provide a rubber which shall require a minimum of time and power in the breaking-down and mixing operation.

The invention resides in the application of heat to rubber produced by a spray desiccation process at a temperature and for such a time as to bring about a pronounced darkening of the color of the rubber, this darkened color indicating that the changes in the nature of the rubber have taken place so as to give it the improved characteristics above stated. I prefer to apply the heat during the spraying operation, but it is possible to obtain the desired results by subjecting the rubber sprayed at a temperature which produces a comparatively light-colored rubber, to a subsequent heating operation, sufficient to bring about the pronounced darkening in color.

I have discovered that by careful control of the inlet and outlet temperatures of the drying gases in an apparatus suitable for spraying latex to produce crude rubber, the change of color indicating the change in characteristics may be brought about, and rubber so produced has very well defined characteristics, other than change in color, which differentiate it from all other rubbers with which I am acquainted. The quantity of heat conveyed to the latex should exceed that required to evaporate the water by such an amount that, in the case of ammonia-preserved latex to which no other substance has been added, the rubber will become of dark color and a substantial portion of the protein ingredients are rendered insoluble in water. The time required for this effect to take place will depend upon the rate at which heat is conveyed to the rubber. This rate will further depend upon two factors—the temperature of the gases and the quantity of gases with which the rubber comes in contact in a given time. The rate of change of color or darkening of the rubber may be accelerated by the application of heat beneath the floor upon which the dried rubber particles collect.

To give a concrete illustration of a method of carrying out the invention, I would refer to the apparatus described in Patent No. 1,428,526, dated September 12, 1922, and granted to C. E. Bradley and J. G. Coffin. A commercial apparatus built in substantially exact accordance with the apparatus shown in said patent was used, except that means were provided for applying heat to the floor of the chamber upon which the rubber was deposited, so as to maintain it at about 200° F. The rotating disc of the apparatus was located at a height of about thirty feet from the floor of the chamber. The latex used contained about thirty-three per cent total solid contents, and the temperature of the entering gases was 650° F. and the temperature of the gases at the exit at the bottom of the chamber was 230° F. Under these conditions, and spraying the latex at the rate of 172 gallons per hour, the resulting crude rubber is of dark brown color and has the characteristics herein specifically referred to. It is important that the temperature and quantity of the drying gas should be carefully regulated with respect to the total solid contents of the latex and the rate at which the latex is sprayed. If latex with a higher percentage of total solid contents is being sprayed, and at the same rate of spraying, the temperature of the entering gases need not be so high, and, on the contrary, if there is a lower percentage of total solid contents in the latex operated on, the temperature should be higher.

The crude rubber obtained by the practice of my invention is much softer and easier to manipulate in the breaking-down operations than ordinary sprayed rubber, and consumes about the same power and requires about the same time of breaking-down on the mills as the regular standard smoked sheet or pale crêpe. After the breaking-down operation it has improved characteristics as compared with ordinary sprayed rubber, in that it is more plastic and "tacky," characteristics which the rubber manufacturer desires. It has all the advantages to an enhanced degree of ordinary sprayed rubber as compared with other rubbers, in that it vulcanizes in a much shorter time, has a much higher tensile, a better resistance to abrasion and much better ageing qualities.

The rubber subject of my invention has very well defined characteristics, as will be indicated by the following table:

|  | Percentage of water-soluble material extracted. | Percentage of acetone extract. | Percentage of ash in water-soluble material. |
| --- | --- | --- | --- |
| Ordinary sprayed rubber | 6.05 | 4.6 | 14.5 |
| Crêpe | .13 | 2.8 | 62.3 |
| Smoked sheet | .30 | 2.8 | 45.0 |
| Pará | .38 | 2.5 | 35.6 |

It will be understood that the rubbers designated above as "crêpe," "smoked sheet" and "pará" are practically the only rubbers now in commercial use, and are all derived from the latex of the Hevea tree by different methods of coagulation. Small quantities of other rubbers are used, such as guayule, wild African rubbers, and rubbers from the *Ficus elastica* and Castilloa trees, but these are used in such small quantities as to be practically negligible, and all of them are differentiated from rubbers derived from Hevea in that they all have a much higher percentage of resin, which is determined by a process of extraction with acetone.

As compared with the above, rubber produced by my process in its preferred form will have 3.8 per cent of acetone-soluble material and a water extract of 1.54 per cent and 21.7 per cent of ash on complete combustion of the dried water-soluble ingredients. It is true, however, that these percentages may vary to 4.4 per cent of acetone-soluble material and 5.60 per cent of water extract with an ash content of 16 per cent of the water-soluble materials, and still the rubber will show improvement to a marked degree over all other rubbers, including ordinary sprayed rubber, and will have a plainly evident characteristic of brown or dark brown color. In obtaining all the water-extraction tests above recited, the rubber is sheeted to a thickness from .025 to .030 of an inch on a cold mill, and then cut into strips from .07 to .14 of an inch wide, and 1½ inches long. Ten grams of the rubber in this strip form are placed in 400 cc. of distilled water and heated for eight hours at 70° to 80° C. The water is then poured off and 200 c. c. of water is added to the rubber and heated at the same temperature for 2½ hours. The water is then poured off, and added to the water poured off after the first heating. 100 c. c. of distilled water is now added to the rubber to thoroughly wash it, and this washing water is added to the water in which the rubber has been heated. The combined water extract is filtered and evaporated to dryness in a tared beaker. The dried extract is heated for two hours at 100° C. before the final weighing. It will be understood that when reference is made in the claims to the water extract, there is meant an extract of the water-soluble materials obtained by following precisely the method just above outlined.

As above stated, the rubber produced according to my invention is preferably produced at a temperature which will give under the foregoing extraction treatment an amount of water-soluble material of 1.54 per cent. If this water extract is completely burned, the ash content will be found to be 21.7 per cent as above stated. In the case of pale crêpe, smoked sheet and fine pará, the percentage of water extract is very much smaller, whereas the percentage of ash in the water extract is very much greater.

Rubber produced according to my invention may be also subjected to another test which differentiates it from all other rubbers, namely, if we take the water extract of these rubbers obtained by the method above described and before the solution has been subjected to any evaporation a quite heavy precipitate is obtained with basic lead acetate when added as a 10 per cent water solution, but only a slight precipitate with normal lead acetate added in the same manner. With ordinary sprayed rubber a heavy precipitate is obtained both with basic lead acetate and normal lead acetate, while with the standard rubbers, pale crêpe, smoked sheet and fine pará, there is distinctly less precipitate with basic lead acetate and practically no precipitate with normal lead acetate.

My research up to the present has not been exhaustive enough to enable me to give with certainty the reasons why rubber produced according to my invention should have the desirable properties heretofore enumerated as compared with all other rubbers, nor can I state at this time with certainty why the characteristic differences above enumerated influence the properties of the rubber both before and after vulcanization, but my belief is that the results are obtained by the application of heat to the rubber, or, in the particular instance of spray desiccation under which I have produced this rubber, to the total solid contents of the latex including the non-rubber contents as well as the rubber content. Probably the heat applied renders the greater part of the proteins insoluble and perhaps decomposes the bulk of the nitrogenous compounds. A simple and plainly apparent distinguishing characteristic of my rubber is its brown or dark brown color, and where an extremely soft rubber is desired the brown color may be so dark as to be practically black. It is true that smoked sheet and Pará rubbers both have a brown color, but this is the result of a smoking process and usually phenol products are present in these rubbers. The presence of the smoke constituents in the rubber is easily detected by its odor. In the brown rubber produced by my invention no smoke constituents are present, so that it can be distinguished by its brown color and the absence of any smoke constituents.

Having thus described my invention, what I claim and desire to protect by Letters Patent is:—

1. A process for obtaining crude rubber which consists in desiccating the latex to obtain substantially all the solid constituents thereof and heating the constituents so as to obtain a product dark colored throughout its mass.

2. A spray desiccation process for producing crude rubber from latex, which consists in subjecting the same during the spraying operation to heat sufficient to render the dried rubber of dark color.

3. A spray desiccation process for producing crude rubber from latex, which consists in subjecting the same during the spraying operation to heat sufficient to render the dried rubber of dark color and to render the major portion of its protein constituents insoluble in water.

4. A crude rubber of dark color containing less than five per cent of acetone-soluble material and more than one per cent of water-soluble material.

5. A crude rubber of dark color containing more than one per cent of water-soluble material.

6. A crude rubber containing not less than one per cent and not more than six per cent of water-soluble material.

7. A crude rubber whose water-soluble material will upon complete combustion yield over fifteen per cent and less than twenty-five per cent of its dry weight in ash.

8. A crude rubber containing not less than one per cent and not more than six per cent of water-soluble material, which material will, upon complete combustion, yield over fifteen per cent and less than twenty-five per cent of its dry weight in ash.

9. A crude rubber whose water extract gives a heavy precipitate with basic lead acetate and only a slight precipitate with normal lead acetate.

10. A crude rubber whose water extract gives a heavy precipitate with basic lead acetate and only a slight precipitate with normal lead acetate, the dried solid matter of the water extract yielding over fifteen per cent and less than twenty-five per cent of ash upon complete combustion.

Signed at New York city, county of New York, and State of New York, this 10th day of May, 1924.

RUSSELL HOPKINSON.